(12) United States Patent
Drap et al.

(10) Patent No.: US 6,776,034 B2
(45) Date of Patent: Aug. 17, 2004

(54) METHOD OF TESTING A RUN-FLAT TIRE COMPONENT

(75) Inventors: Sebastien Drap, Dallet (FR); Francois Hottebart, Ashikaga (JP)

(73) Assignee: Michelin Recherche et Technique S.A. (CH)

( * ) Notice: Subject to any disclaimer, the term of this patent is extended or adjusted under 35 U.S.C. 154(b) by 294 days.

(21) Appl. No.: 10/141,694

(22) Filed: May 7, 2002

(65) Prior Publication Data

US 2003/0209095 A1 Nov. 13, 2003

(51) Int. Cl.[7] .............................................. E01C 23/00
(52) U.S. Cl. ...................................................... 73/146
(58) Field of Search ................................ 73/146, 865.9, 73/9, 856.3

(56) References Cited

U.S. PATENT DOCUMENTS

| | | | |
|---|---|---|---|
| 3,976,114 A | * | 8/1976 | Patecell ........................ 152/158 |
| 5,634,993 A | | 6/1997 | Drieux et al. |
| 5,868,190 A | | 2/1999 | Willard, Jr. et al. |
| 5,891,279 A | | 4/1999 | Lacour |

* cited by examiner

*Primary Examiner*—Robert Raevis
(74) *Attorney, Agent, or Firm*—Dority & Manning, P.A.

(57) ABSTRACT

A method of testing a run-flat tire component is provided. In one exemplary embodiment, the method includes positioning a run-flat component upon a wheel, accelerating the wheel to a predetermined speed, decelerating the wheel to a stop, and determining any rotation of the run-flat component relative to the wheel.

20 Claims, 4 Drawing Sheets

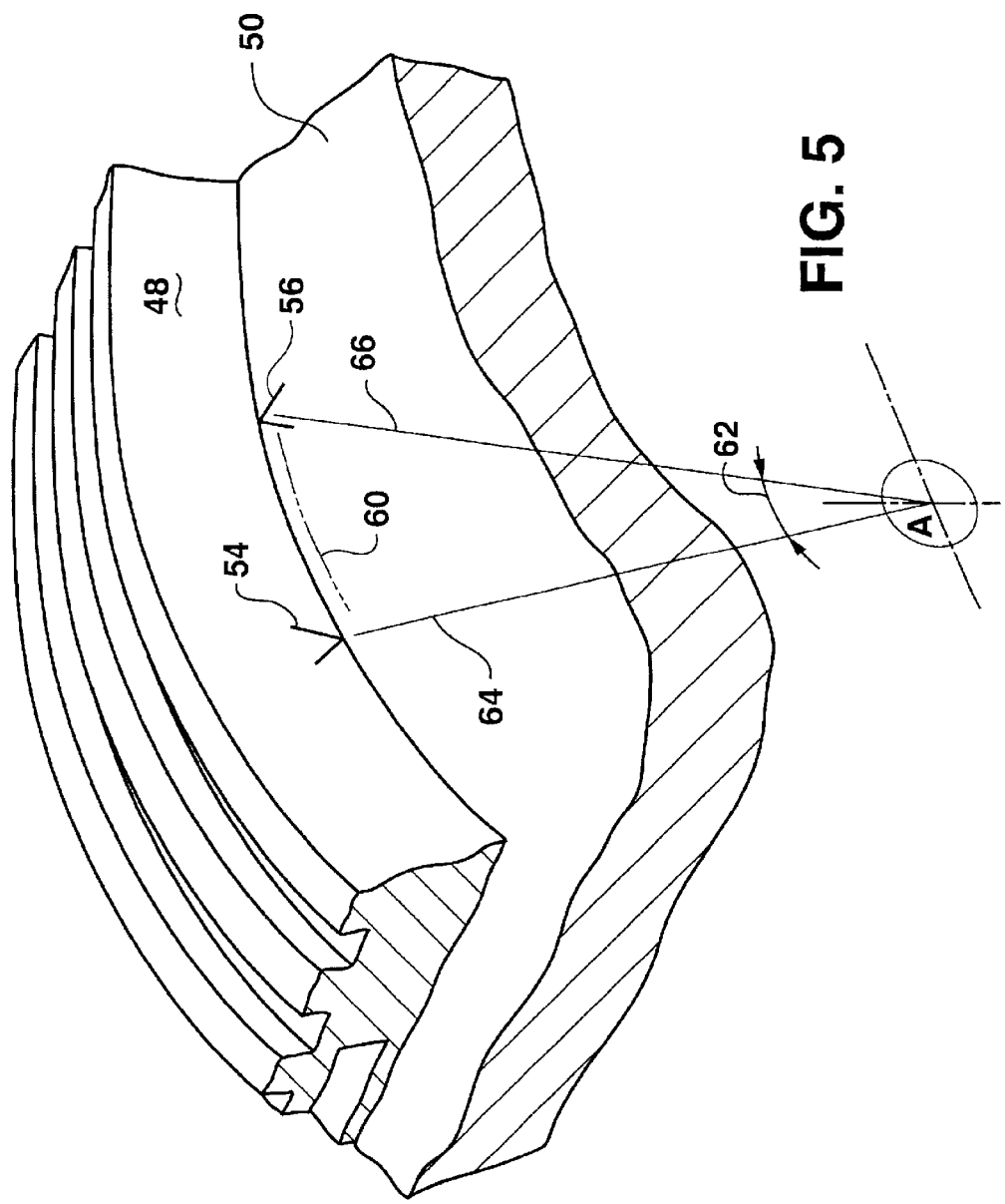

METHOD OF TESTING A RUN-FLAT TIRE COMPONENT

BACKGROUND OF THE INVENTION

Generally, a pneumatic tubeless tire is made of a tread section with two side walls. Beads are located at the end of each side wall and are typically rigid. The beads fit onto a rim. Putting air pressure into the interior of the tire causes the beads to seat against the rim and securely hold the tire onto the rim. Air pressure is maintained because the bead presses a sealing surface on the tire against a sealing surface on the rim so as to preclude air loss.

Manufacturers have conceived various designs that will allow a pneumatic tubeless tire to continue to function after a loss of air pressure. One such design may be referred to as run-flat tire. The design and use of a run-flat tire is desirable for several reasons. First, a sudden loss of air pressure in a conventional tire can result in a shifting of the position of the tire, and subsequently, a change in the internal tensioning forces originally imparted by the tire on the rim to hold the tire thereon. The tire may become disengaged from the rim under certain circumstances.

Second, a loss of air pressure forces the crown of a conventional tire down onto the rim. The rim must then assume the loading from the weight of the vehicle and the dynamic forces of the ride. As the rim is not designed for this purpose, damage to either the rim or even the wheel and axle supporting the rim can result. This in turn can lead to costly repairs in addition to leaving the driver and passenger stranded.

An example of a design of a run-flat tire is illustrated in U.S. Pat. No. 5,891,279 that is owned by the assignee of the present invention and is incorporated by reference herein in its entirety for all purposes. Tire and rim assemblies of this type have a ring shaped insert, typically formed of a flexible elastomeric material, disposed on the rim. The tire surrounds this insert. When the tire loses air pressure, the tire will deform and contact the insert. The load of the vehicle and the dynamic forces of the ride will then be borne by the insert. The inserts allow drivers additional mileage by which to travel to a convenient location where the tire can be inspected and repaired or replaced.

Sometimes during operation of a run-flat tire that utilizes an insert, the insert could possibly slip or rotate in relation to the rim. Slipping of the insert is particularly possible during periods of high speed operation. The balance of the tire-insert-wheel assembly could be affected, resulting in vibration from the assembly during rotation. A method of testing the design of such inserts (also referred to as a support ring) on wheel assemblies is desired so that any slipping of the insert can be studied and reasonably reduced or eliminated where necessary and feasible.

BRIEF SUMMARY OF THE INVENTION

Objects and advantages of the invention will be set forth in part in the following description, or may be obvious from the description, or may be learned from practice of the invention.

In one exemplary embodiment, the present invention provides a method of testing a support ring used in a wheel assembly. This method includes positioning the support ring upon a wheel rim and noting the relative position of the support ring on the wheel rim. The wheel rim and support ring are then accelerated to a predetermined rotational speed. By predetermined rotational speed, it is meant only that a rotational speed for the test is selected. After reaching the predetermined rotational speed, the rotation of the wheel rim and support ring are brought to a stop at a controlled deceleration rate. The amount of any rotation of the support ring relative to the wheel rim is then determined.

In another exemplary embodiment of the present invention, a method of testing a run-flat tire component is provided that includes mounting the run-flat tire component on a wheel for testing. The position of the run-flat tire component relative to the wheel is marked. The wheel and the run-flat tire component are then rotated at a selected test speed. The wheel is decelerated at a determined rate of deceleration. The amount of rotation, if any, is then determined.

Another exemplary embodiment a method for centrifugally testing a run-flat tire component is provided that includes mounting a run-flat tire component on a wheel and connecting the wheel to a rotatable power source. A first mark is placed on the run-flat tire component and a second mark is placed on the wheel. The first mark and second mark are located adjacent to each other at the beginning of the test. The wheel is rotated at a determined speed and then slowed at a constant rate until the wheel stops rotating. A determination is then made as to whether the run-flat tire component has rotated relative to the wheel.

In further exemplary embodiments, a method for centrifugally testing a run-flat tire component includes the steps immediately discussed and further includes the step of recording the amount of any rotation of the run-flat tire component relative to the wheel. In yet another alternative embodiment, a method for centrifugally testing a run-flat tire component is provided that includes the steps immediately discussed and further includes the steps of increasing the determined speed by a selected increment and then repeating the steps of rotating, slowing, and determining. In still another exemplary embodiment, a method for centrifugally testing a run-flat tire component includes the steps discussed above and also includes the additional step of inspecting the run-flat tire component for damage after the step of slowing. Another embodiment of a method for centrifugally testing a run-flat tire component includes the steps discussed above, and further includes the steps of inspecting the run flat-tire component for damage after the step of slowing, increasing the determined speed by a selected increment, and repeating the steps of rotating, slowing, determining, and inspecting.

Another alternative embodiment of the present invention exists in providing a method for centrifugally testing a run-flat tire component that includes the steps discussed above and further includes the steps of inspecting the run-flat tire component for damage, increasing the determined speed by a selected increment, and repeating the steps of rotating, slowing, determining, and inspecting until a maximum determined speed is obtained. Another embodiment of a method for centrifugally testing a run-flat tire component includes the steps immediately discussed above and further includes the steps of inspecting the run-flat tire component for damage, increasing the determined speed by a selected increment, and repeating the steps of rotating, slowing, determining, and inspecting until rotation of the run-flat tire component relative to the wheel is determined. In still another embodiment, a method for centrifugally testing a run-flat tire component includes the steps immediately discussed above and further includes inspecting the run-flat tire component for damage, increasing the determined speed by a selected increment, and repeating the steps of rotating, slowing, determining, and inspecting until damage to the run-flat tire component occurs.

These and other features, aspects and advantages of the present invention will become better understood with reference to the following description and appended claims. The accompanying drawings, which are incorporated in and constitute a part of this specification, are used to illustrate exemplary embodiments of the invention and, together with the description, serve to explain the principles of the invention. As will be apparent to one of ordinary skill in the art using the teachings disclosed herein, the present invention may be used in a variety of embodiments to test a variety of run-flat tire components.

BRIEF DESCRIPTION OF THE DRAWINGS

FIG. 5 is a partial perspective and sectional view of the exemplary apparatus of FIG. 4 taken along axis A.

DETAILED DESCRIPTION

Figure 1:
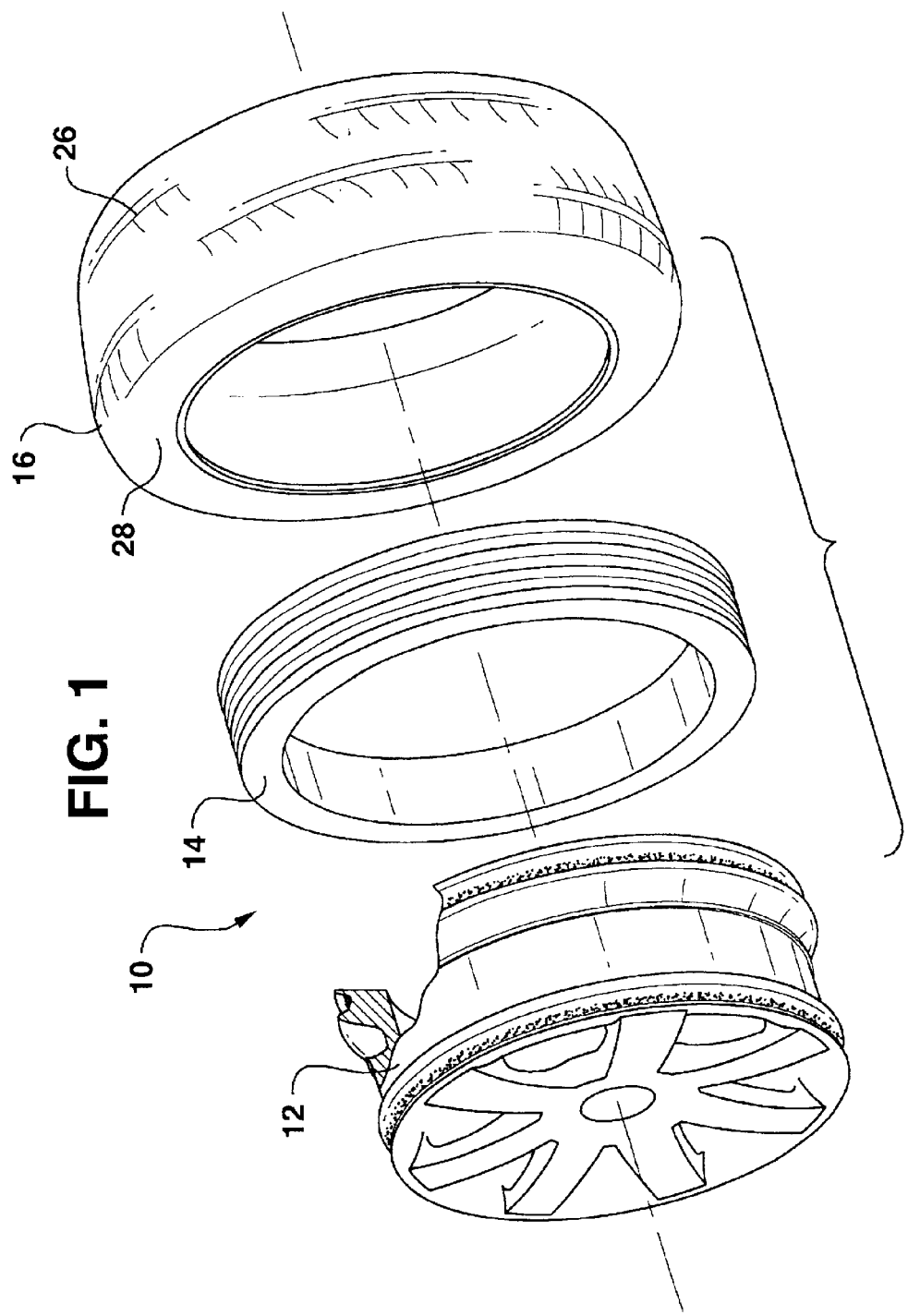
FIG. 1 is an exploded assembly view of an exemplary embodiment of a run-flat tire assembly including components that may be tested using the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
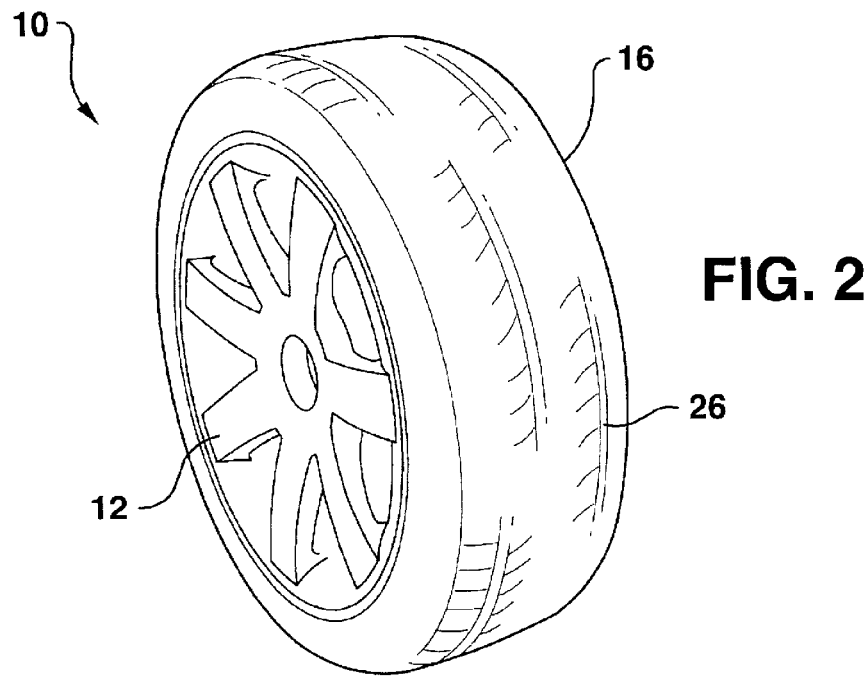
FIG. 2 is a perspective view of the tire assembly shown in FIG. 1.

Referring now to the drawings, an example of a run-flat tire assembly 10 containing components that may be tested in accordance with embodiments of the present invention is shown in FIG. 1. The tire assembly 10 is shown as being made of three basic components. First, an alloy or steel integral wheel rim 12 is provided onto which a support member 14 is placed. The support member 14 shown in FIG. 1 is a ring. Next, a rubber tire 16 is placed onto the rim 12 and completely surrounds the support member 14. The tire assembly 10 is shown in an assembled state in FIG. 2. The tire 16 is vertically anchored to the rim 12 as described in U.S. Pat. No. 5,634,993 that is assigned to the assignee of the present invention and incorporated herein by reference for all purposes in its entirety.

The support member 14 is present in order to carry the static and dynamic loading the tire 16 is subjected to during the situation in which the tire 16 loses air pressure. Upon loss of air pressure, the tire 16 will collapse down onto the support member 14, allowing for the support member 14 to assume the loading. The support member 14 is shown in FIG. 1 as being an elastomeric ring; however, other types of support members 14 may be envisioned and tested in conjunction with the present invention. For instance, the support member 14 may be configured as that shown in U.S. Pat. No. 5,891,279 that is assigned to the assignee of the present invention and incorporated herein by reference for all purposes in its entirety. The present invention is not limited to use with any one particular type of support member 14.

A tire assembly 10 that uses a support member 14 may be referred to as a run-flat tire assembly 10. Such a tire assembly 10 is intended to allow a vehicle to be driven after a loss of air pressure for some distance while protecting the rim 12 or wheel from damage. However, other run-flat tire assemblies are known in the art that do not use a support member 14. One such run-flat tire assembly is disclosed in U.S. Pat. No. 5,868,190 that is assigned to the assignee of the present invention and is incorporated herein by reference in its entirety for all purposes.

Figure 3:
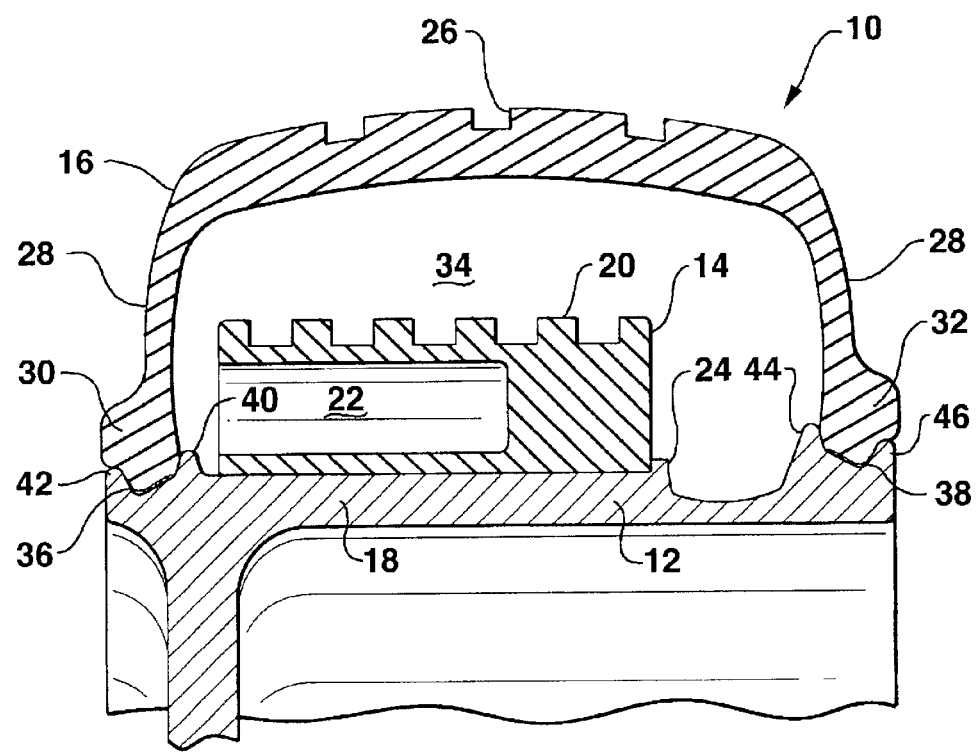
FIG. 3 a partial cross-sectional view of another exemplary embodiment of a run-flat tire assembly including components that may be tested in accordance with the present invention.

FIG. 3 shows a partial cross sectional view of a tire assembly 10 in accordance with one exemplary embodiment of a run-flat tire assembly. As shown, the support member 14 is similar to that disclosed in the '279 patent mentioned above, and is located on a cylindrical section 18 of the rim 12. The support member 14 may have a contoured outside surface 20. Additionally, a cavity 22 is located inside of the support member 14. The cavity 22 may extend the whole length of support member 14 or only around a portion of the circumference of support member 14. The cavity 22 is advantageous because it decreases the weight of the support member 14. A support member retaining flange 24 is present in order to help locate and secure the support member 14 on the cylindrical section 18 of rim 12.

As shown for the exemplary run-flat tire assembly of FIG. 3, tire 16 is provided with tire tread 26 on its outer surface. Two side walls 28 extend from the tire tread 26 portion of tire 16. In this exemplary embodiment for a run-flat tire assembly, the side walls 28 are substantially vertical in orientation once seated onto the rim 12. A first bead 30 is present at the end of one of the side walls 28, and a second bead 32 is present at the end of the other side wall 28. The use of beads 28 and 30 helps to keep the tire 16 attached to the rim 12 and also helps to create an air seal to maintain air pressure in the space 34 formed between the tire 16 and rim 12.

Rim 12 has a first bead seat 36 and a second bead seat 38 formed therein for seating the first and second beads 30 and 32 respectively. The first bead seat 36 is formed by a pair of humps 40 and 42. The second bead seat 38 is formed by a pair of humps 44 and 46. An air seal is formed between the first bead 30 and the first bead seat 36. Similarly, an air seal is also formed between the second bead 32 and the second bead seat 38. These air seals prevent air from escaping around the beads 30 and 32 respectively.

During run-flat or low pressure operation, tire 16 engages support member 14 enabling continued travel of a vehicle with reasonable and appropriate operation by the driver. During normal operation of tire 16, any relative movement or shifting between support member 14 and rim 12 may cause heat build-up and wear of support member 14 due to the frictional forces present at the areas of contact. In turn, a loss of performance and life of support member 14 and other components may result. While such relative movement may occur whenever the tire 16 is rotating, such movement is more likely to occur under high torque conditions such as during acceleration, deceleration, or operation at high speeds. Accordingly, the ability to test for such relative movement among various designs for support member 14 and/or related components is desirable for this and other reasons.

Figure 4:
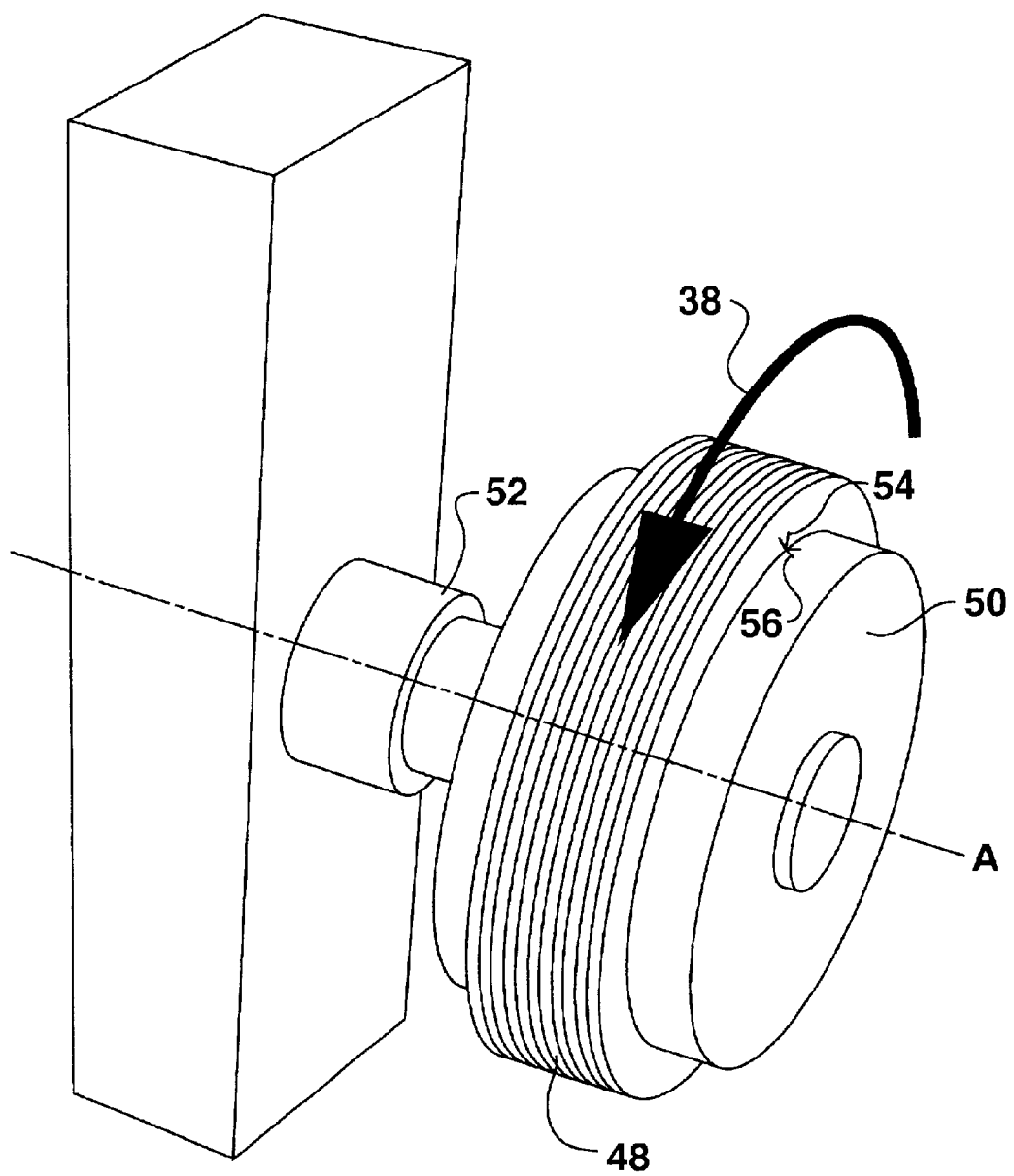
FIG. 4 is a schematic representation of an exemplary apparatus that may be used with an exemplary embodiment of the present invention.

Referring to FIGS. 4 and 5, an exemplary embodiment of a method for centrifugally testing a run-flat tire component is illustrated. A support member or support ring 48 is mounted on a wheel 50. As illustrated in FIGS. 4 and 5, support ring 48 and wheel 50 are exemplary only. Each may take on any number of design configurations as are desired for testing. Preferably the contact surfaces between wheel 50 and support ring 48 create substantially similar or identical frictional forces as would be encountered during actual operation. More specifically, the contact surfaces mimic the frictional forces that would be encountered between the support ring 14 and rim 12 illustrated in FIG. 3.

Wheel 50 is connected to a rotatable power source 52, which is represented schematically in FIG. 4. Preferably, power source 52 is equipped with controls for setting and determining the rate of acceleration, deceleration, and/or speed of rotation of wheel 50 during testing. As will be discussed, rotatable power source 52 is used to rotate wheel 50 and the attached support ring 48 under conditions that would be encountered during use of a run-flat tire on a vehicle. Accordingly, rotatable power source 52 is capable of accelerating and decelerating wheel 50 at rates similar to and perhaps higher than the rates a wheel might experience during operation of a vehicle. Also, rotatable power source 52 can subject wheel 50 to rotation speeds at least as high as what might be obtained during operation of a vehicle.

Continuing with a description of the exemplary embodiment, the position of support ring 48 relative to wheel 50 is determined prior to rotating wheel 50. By way of example only, a first mark 54 is placed on the support ring 48, and a second mark 56 is placed in an adjacent location on wheel 50. Regardless, the position of the support ring 48 relative to wheel 50 is noted prior to rotation of wheel 50.

Using the rotatable power source 52, wheel 50 and support ring 48 are caused to rotate until a desired or determined speed is obtained. Such rotation is illustrated by movement arrow 58 in FIG. 4. While movement arrow 58 shows counterclockwise rotation, such rotation of wheel 50 may also be clockwise if desired.

After the determined speed is reached, the rotation of the wheel 50 is slowed at a constant rate or constant amount of deceleration until the wheel 50 stops rotating. Any desired deceleration rate may be selected. By way of example only, the deceleration rate may be based on the specifications for a vehicle braking system such as the maximum rate of deceleration provided or obtainable from a vehicle's braking system. By way of further example only, a deceleration rate in the range of 20 to 50 radians per second squared is preferable. However, the present invention is not limited to any particular deceleration rate and one of skill in the art will understand that any rate of deceleration may be selected using the teachings disclosed herein.

Once the wheel has stopped rotating, the amount of any rotation of the support ring 48 relative to the wheel 50 is determined. By way of example only, this step may be accomplished by comparing the relative position of first mark 54 and second mark 56. FIG. 5 illustrates an example where support ring 48 has rotated angularly with respect to wheel 50. As shown, first mark 54 is no longer adjacent to second mark 56. The amount of the relative movement of first mark 54 relative to second mark 56 is an indication of the amount by which support ring 48 has rotated relative to wheel 50. Once the amount of any such rotation is determined, it may be recorded. By way of example only, the length 60 along the circumference of wheel 50 may be measured to determine the amount of any rotation. By way of further example, the angle 62 between the radii 64 and 66 formed by marks 54 and 56 and the axis of rotation A may also be used to determine and record the amount of rotation.

Upon completing the above steps at a determined speed or rate of rotation, it may be desirable to repeat testing of support ring 48 at other selected speeds and/or other rates of acceleration or deceleration. For example, the initial determined speed may be selected as relatively slow with an objective of repeating the test at new speeds that are set by increasing the initial determined speed by selected increments. By way of further example only, the initial test speed may be selected as 500 revolutions per minute. Successive tests may then be performed at predefined increments of between 10 to 50 revolutions per minute. More specifically, the support ring 48 may be tested at 500 revolutions per minute, 550 revolutions per minute, 600 revolutions per minute, and so on. In addition, it may be desirable to perform the test at a given speed of rotation but with different rates of deceleration. By way of further example, it may be desirable to perform the test at a given speed of rotation but with differing rates of acceleration. Using the teachings disclosed herein, one of skill in the art will understand that numerous testing regimens may be designed as desired.

For the exemplary embodiment of a method for centrifugally testing a run-flat tire component being described, the test may be repeated at increasing speeds using predefined increments and a given rate of deceleration until one or more of the following events occurs. The first such event is where movement of the support ring relative to the wheel is observed. As such movement is not desirable, the conditions under which such movement occurred is recorded for future reference. For example, the rate of rotation of wheel 50, the rate of deceleration of wheel 50, and the amount of rotation of support ring 48 relative to wheel 50 may be recorded. Such a test result, for example, may indicate the maximum rate at which a vehicle could be slowed during operation before rotation of the support ring 48 begins to occur.

The second event at which testing is stopped is when a maximum test speed is obtained before movement of the support ring 48 relative to the wheel 50 occurs. Such maximum test speed may be determined, for example, by selecting a speed that exceeds the maximum speed reasonably expected by a vehicle that will be using such support ring 48 and/or wheel 50. By way of example only, the maximum test speed used may be 350 kilometers per hour or 3000 revolutions per minute. In addition, various other parameters may be used for selecting a maximum test speed as will by understood by one of skill in the art using the teachings disclosed herein.

The third event at which testing is stopped is when a mechanical failure or damage occurs to the support ring 48. Under such event, the conditions at which failure occurred are recorded for a given design of support ring 48. In this way, this exemplary embodiment of the present invention provides a way of testing the structural integrity of a given design for support ring 48.

It should be understood that the present invention includes various modifications that can be made to the embodiments of a method of testing a run-flat tire component as described herein as come within the scope of the appended claims and their equivalents. By way of example only, the order of steps for the method of testing may be modified and different apparatus than that shown in the figures may be utilized. The aforementioned description of embodiments of the present invention is by way of example only and not intended as a limitation on the spirit and scope of the claims that follow.

What is claimed is:

1. A method of testing a support ring used in a wheel assembly, comprising the steps of:

positioning the support ring upon a wheel rim and noting the relative position of the support ring on the wheel rim;

accelerating the wheel rim and support ring to a predetermined rotational speed;

from the predetermined rotational speed, stopping the wheel rim and support ring at controlled deceleration rate; and determining any relative rotational movement between the support ring and the wheel rim.

2. A method of testing a support ring used in a wheel assembly as in claim 1, further comprising the step of inspecting the support ring for any damage or wear after said stopping.

3. A method of testing a support ring used in a wheel assembly as in claim 1, further comprising the step of recording the amount of any rotation of the support ring relative to the wheel rim.

4. A method of testing a support ring used in a wheel assembly as in claim 1, further comprising the step of increasing said predetermined rotational speed by a selected increment and then repeating said steps of accelerating, stopping, and determining.

5. A method of testing a support ring used in a wheel assembly as in claim 1, wherein said controlled deceleration rate is constant.

6. A method of testing a support ring used in a wheel assembly as in claim 1, wherein said controlled deceleration rate is determined from the specifications for a vehicle braking system.

7. A method of testing a run-flat tire component, comprising the steps of:

mounting the run-flat tire component on a wheel;

marking the position of said component relative to said wheel;

rotating said wheel at a selected test speed;

decelerating said wheel at a determined rate of deceleration; and determining whether said run-flat tire component has rotated relative to said wheel.

8. A method of testing a run-flat tire component as in claim 7, further comprising the step of increasing said selected test speed by a selected increment and repeating said steps of rotating, decelerating, and determining.

9. A method of testing a run-flat tire component as in claim 8, further comprising repeating said steps of claim 8 until one or more of the following events occurs:

i) a maximum said selected speed is reached, ii) a mechanical failure is observed, and iii) damage to said run-flat tire component is observed.

10. A method of testing a run-flat tire component as in claim 8, wherein said selected increment is 1 to 60 revolutions per minute.

11. A method of testing a run-flat tire component as in claim 7, further comprising the step of recording the amount by which said component has rotated relative to said wheel.

12. A method of testing a run-flat tire component as in claim 7, further comprising the step of inspecting said run-flat tire component for any damage or wear.

13. A method for centrifugally testing a run-flat tire component, comprising the steps of:

mounting a run-flat tire component on a wheel;

connecting said wheel to rotatable power source;

placing a first mark on said run-flat tire component, placing a second mark on said wheel, wherein said first mark and said second mark are located adjacent to each other;

rotating said wheel at a determined speed with said rotatable power source;

slowing said wheel at a constant rate until said wheel stops rotating; and determining whether said run-flat tire component has rotated relative to said wheel.

14. A method for centrifugally testing a run-flat tire component as in claim 13, further comprising the step of recording the amount of any rotation of said run-flat tire component relative to said wheel.

15. A method for centrifugally testing a run-flat tire component as in claim 13, further comprising the steps of increasing said determined speed by a selected increment and repeating said steps of rotating, slowing, and determining.

16. A method for centrifugally testing a run-flat tire component as in claim 13, further comprising the step of inspecting said run-flat tire component for damage after said step of slowing.

17. A method for centrifugally testing a run-flat tire component as in claim 16, further comprising the steps of increasing said determined speed by a selected increment and repeating said steps of rotating, slowing, determining, and inspecting.

18. A method for centrifugally testing a run-flat tire component as in claim 17, further comprising the step of repeating said rotating, slowing, determining, inspecting, and increasing steps until a maximum determined speed is obtained.

19. A method for centrifugally testing a run-flat tire component as in claim 17, further comprising the step of repeating said rotating, slowing, determining, inspecting, and increasing steps until rotation of said run-flat tire component relative to said wheel is determined.

20. A method for centrifugally testing a run-flat tire component as in claim 17, further comprising the step of repeating said rotating, slowing, determining, inspecting, and increasing steps until damage to said run-flat tire component occurs.

* * * * *